United States Patent [19]

Lee et al.

[11] 4,446,057

[45] May 1, 1984

[54] APPARATUS AND METHOD FOR THE MANUFACTURE OF GAS FILTERS

[75] Inventors: Kung-You Lee; Matthew A. McMahon, both of Wappingers Falls, N.Y.; Justin C. Powell, Fairfax, Va.

[73] Assignee: Texaco Inc., White Plains, N.Y.

[21] Appl. No.: 396,518

[22] Filed: Jul. 8, 1982

[51] Int. Cl.$^3$ ............................................. B01J 23/08
[52] U.S. Cl. ................................. 502/355; 427/430.1; 427/435; 427/376.2; 427/376.4
[58] Field of Search ................... 427/345, 126.4, 430.1, 427/376.2, 376.4, 435; 423/628; 252/463; 422/239, 225, 226, 233, 234, 236, 237, 189, 297, 238

[56] References Cited

U.S. PATENT DOCUMENTS

| | | | |
|---|---|---|---|
| 406,597 | 7/1889 | Schupphaus et al. | 422/238 X |
| 2,958,582 | 11/1960 | Hervert et al. | 423/628 X |
| 3,231,520 | 1/1966 | Leak et al. | 252/463 |
| 3,991,164 | 11/1976 | Sheibitz et al. | 422/225 X |
| 4,287,098 | 9/1981 | Farworth et al. | 252/463 |

Primary Examiner—Sam Silverberg
Attorney, Agent, or Firm—Carl G. Ries; Robert A. Kulason; Martin M. Glazer

[57] ABSTRACT

An apparatus and method for coating at least one substrate with an alumina hydrate film includes a coating vessel for containing a caustic coating solution, and at least one support within the coating vessel upon which are mounted substrates and porous containers. The porous containers hold aluminum metal for reacting with the caustic coating solution. A partition is situated between the porous containers and the substrates, which partition separates the gas bubbles produced by the reaction of the aluminum metal and the caustic coating solution from the substrates and which partition prevents the gas bubbles from contacting the substrates.

8 Claims, 3 Drawing Figures

APPARATUS AND METHOD FOR THE MANUFACTURE OF GAS FILTERS

This invention relates to an improved apparatus and method for the large scale production of gas filters, and more particularly for an apparatus and a method of forming such filters with more uniform coatings.

DESCRIPTION OF THE PRIOR ART

In recent years, governments have become increasingly aware of the dangers to public health resulting from exhaust fumes of internal combustion engines. Among the constituents of exhaust gases which give rise to concern are carbon monoxide, unburnt hydrocarbons, nitrogen oxides, carbon containing particulate matter, and lead containing particulate matter. Regulations have been issued in many countries to reduce the amount of such emissions in exhaust gases. Attempts have been made to satisfy the requirements of such regulations in several ways:

(a) Internal combustion engines have been designed so that they operate in such a manner as to produce an inherently "cleaner" exhaust.

(b) Gasoline in which the added lead content is reduced or absent, is being sold on a wider scale than previously.

(c) Attempts have been made to filter the exhaust, or to provide a catalyst which would lead to a more complete combustion of carbon monoxide and unburnt hydrocarbons.

While progress has been made with the first two of the methods set out above, they have the disadvantage that the development of a completely new engine for motor vehicles is extremely expensive so that manufacturers would wish, as far as as possible, to continue to produce engines whose development has already largely been carried out. In addition, the production of lead-free gasoline means that refineries would need to be run in a less efficient manner and use more crude oil than is possible when the octane rating of lower-octane hydrocarbons can be increased by the inclusion of lead compounds.

U.S. Pat. No. 3,231,520 and British Pat. No. 1,058,706 disclose a structure comprising a substrate having an adherent film or layer of alumina formed thereon which serves as a support for catalytic materials to promote a variety of reactions including the oxidation of exhaust gases from internal combustion engines. The adherent alumina film is formed by contacting the substrate with a coating solution of an alkali metal aluminate which deposits a film of alumina hydrate on the substrate. The film is then dried and calcined to produce a hard tenacious film of alumina. U.S. Pat. No. 3,227,659 discloses that the alumina coated structure of U.S. Pat. No. 3,231,520, may be impregnated with a phosphorus-containing material such as an alkali metal phosphate which is useful for the treatment of exhaust gases containing lead-containing particulate matter. U.S. Pat. No. 3,410,651 discloses that the alumina coated structure of U.S. Pat. No. 3,231,520 may be impregnated with a chromium-containing material, such as an alkali or alkaline earth metal chromate, for treating exhaust gases containing lead-containing particulate matter. U.S. Pat. No. 3,362,783 discloses a useful configuration of the alumina coated structure wherein the structure comprises metal wool encased in a metal casing prior to coating with the alumina film so that the alumina coats not only the metal fibers, but also coats the casing thereby bonding the metal fibers to the inside of the casing. This particular structure was effectively employed in the treatment of exhaust gases when it was coated or impregnated with an oxidation catalyst. These alumina coated structures have the ability to withstand severe abrading and vibration which makes them particularly useful as a catalyst support for the treatment of automobile exhaust gases.

British Pat. No. 1,271,710 discloses that alumina coated substrates may also be used for the treatment of exhaust gases without the necessity of impregnating or coating the alumina film with added compounds.

Belgian Pat. No. 849,373 (also French Pat. NR No. 75.39408) notes certain difficulties encountered when attempting to carry out an alumina coating process, and proposes a method of using changes in the concentration of the coating solution to effect coating. The disclosed process is quite expensive, due to the energy required for evaporation of large amounts of water.

It is also known from coassigned U.S. Pat. No. 4,287,098, that exhaust gas filters can be produced by a method which comprises mounting a plurality of the substrates upon a stand, immersing the stand in an alkali metal aluminate solution and subjecting the stand to vertical motion through the alkali metal aluminate solution while alumina hydrate is deposited onto the substrates.

The processes and apparatus described in the prior art were suitable for the manufacture of small numbers of coated substrates for use as gas filters, catalyst supports and the like, but problems were encountered in attempting to manufacture such coated substrates on a larger scale, which would be necessary if they were, for instance, to be made a standard fitting for motor vehicles.

In the processes described in the prior art some aluminum metal was generally added to a caustic solution to form a caustic aluminate coating solution and more aluminum metal was subsequently added to the coating solution as alumina hydrate deposited onto the substrates in contact with the coating solution. The additional aluminum metal was necessary because as alumina hydrate deposited onto the substrate, the concentration of aluminum in the solution decreased and if no more aluminum metal was added, coating would eventually cease before a coating of a desired thickness was formed on the substrate.

The reaction of the aluminum with the caustic solution also produced heat and gas bubbles, generally hydrogen gas bubbles. The rising heated solution, and the bubbles rising up through the coating solution acted to agitate the solution. Previously, aluminum metal was distributed throughout the coating vessel with no attempt to separate the resulting gas bubbles from the substrates. It is now believed that the movement of these bubbles through the substrates affected the uniformity of the coating, not only within each substrate, but also from substrate to substrate, and from a batch of substrates to batch of substrates.

The above enumerated problems will make it difficult to employ the previously used processes, which were generally used on a bench scale, for large scale commercial plants.

SUMMARY OF THE INVENTION

A new apparatus and method now has been found which is useful for the coating of one or more substrates for use as exhaust filters, catalyst supports and the like.

In the apparatus and method for coating the substrates with an alumina film, the gas bubbles produced by the reaction of the aluminum metal with the caustic solution are separated by a partition from the substrates, and the gas bubbles are not permitted to pass through the substrates during the coating process. The apparatus comprises a coating vessel for containing the caustic coating solution; at least one support within the coating vessel for mounting a substrate; at least one porous container for holding aluminum metal which porous container is also mounted on the support; and a partition which is situated between the porous container and the substrate to substantially separate the substrate from the gas bubbles produced by the reaction of the aluminum metal and the caustic coating solution. The partition substantially prevents the contacting of the gas bubbles with the substrate. The partition preferably comprises a solid sheet of a material inert to the caustic solution which physically separates the substrate from the gas bubbles emanating from the porous container. Further, the substrate is not mounted above the porous container thus any gas bubbles rising from the porous container are not able to rise into the substrate.

The apparatus preferably further comprises means for mechanically agitating the caustic coating solution. Such means, which preferably comprises a rotational stirring device, produces a more uniform concentration of the caustic coating solution throughout the coating vessel and aids in the more uniform coating of the substrates.

The invention will be better understood from the following drawing and examples which illustrate but are not meant to limit the present invention.

DETAILED DESCRIPTION OF THE DRAWINGS

Figure 1:
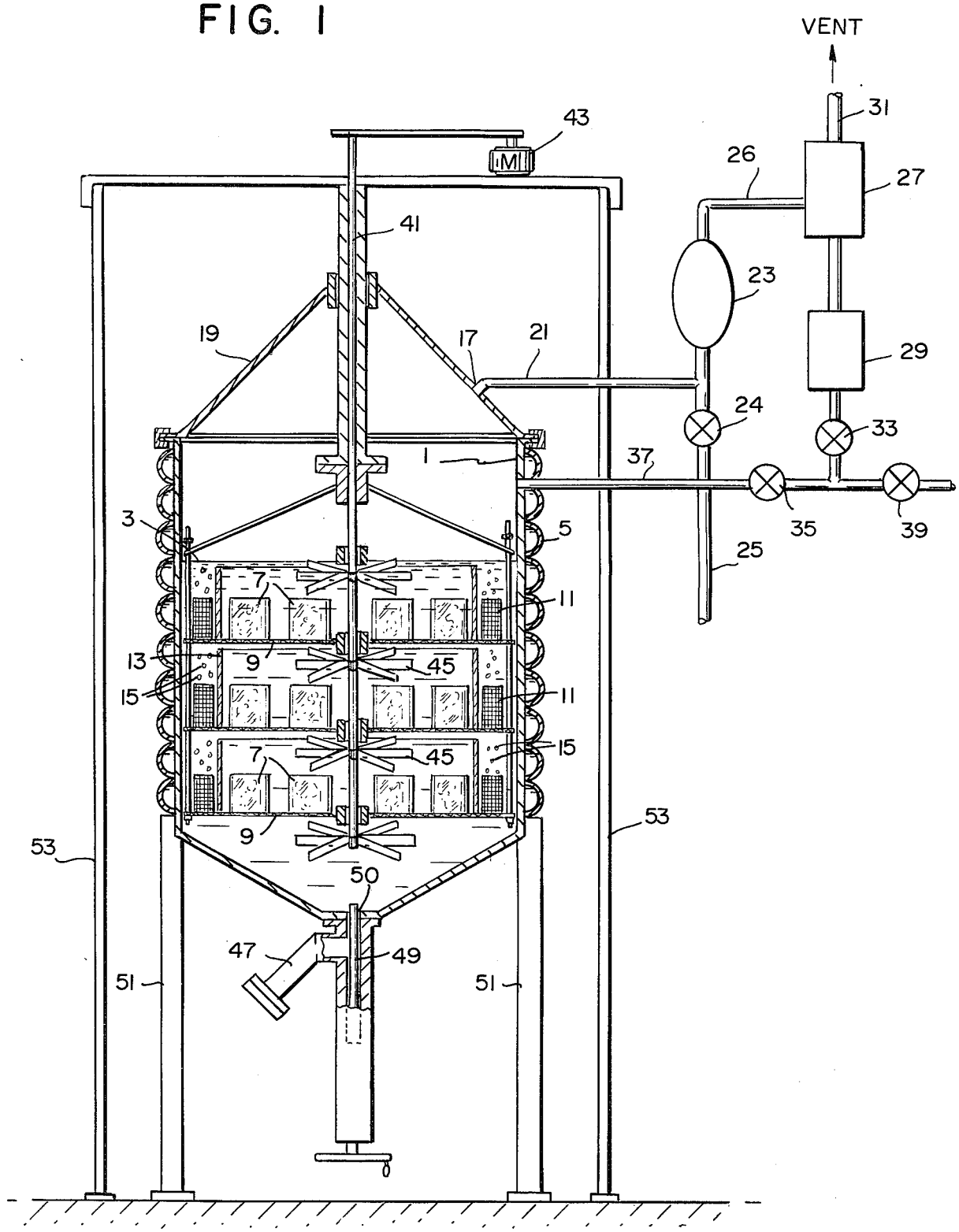
FIG. 1 is a side plan view, partially in cross-section, of a preferred embodiment of the present invention.

Referring now to FIG. 1, a preferred apparatus is illustrated which comprises a substantially cylindrical coating vessel or tank (1) which is formed of a material resistant to the caustic coating solution (3), such as stainless steel. The vessel (1) is illustrated as being provided with an external means for controlling the temperature of the coating vessel (1) and its contents which means is depicted as a steam and/or water jacket (5). A plurality of cased substrates (7) are shown mounted on three substantially circular supports (9) which supports (9) are horizontally mounted within the tank (1) and vertically spaced apart from one another. A plurality of porous or perforated containers (11) are shown located on the periphery of the supports (9).

A substantially cylindrically shaped partition (13) is shown separating the substrates (7), located on an inner portion of the support (9), from the porous containers (11), located on an outer portion of the support (9). The substantially cylindrically shaped partition (13) is shown as having a height almost equal to that of the space between the supports (9). No substrate (7) is located above a porous container (11). The partition (13) guides the gas bubbles (15) produced by the reaction of the aluminum within the porous containers (11) and the caustic solution (3) to be directed away from the substrates (7) and prevents the gas bubbles (15) from contacting the substrates (7). The gas bubbles (15) are depicted as rising from the porous containers (11) to the top of the solution (3). The gas and steam then pass through a gas vent (17) located in a cover (19) which seals the vessel (1) and otherwise prevents the escape of gas and steam from the vessel (1).

The vent (17) is connected through a conduit, preferably a flexible pipe (21) into a foam breaker (23). The coating reaction should be controlled (e.g. by reaction temperature) to avoid foam rising up to vent (17). Foam breaker (23) is used to break a small amount of foam if foam rises up there, and to provide a foam emergency exit through valve (24) and conduit (25). The gas and steam pass from the foam breaker (23) through a second conduit (26) into a condenser (27). Within the condenser (27), the gas and steam are cooled, and the water vapor condenses and passes into a receiver (29). The hydrogen and any other uncondensed gases exit from the top of the condenser (27) through a vent (31). The gas after it exits from the condenser (27), preferably passes through a measuring device (not shown) before being safely vented to the atmosphere. The water from the receiver (29) is returned to the coating vessel (1) through valves (33) and (35) and a return conduit (37). The return of water from the process reduces the need for adding fresh water to the system. However, fresh water can be passed into the system or the solution (3) can be replaced by solution passed in through valve (39) and return conduit (37).

The rising gas bubbles (15) and the heat produced by the reaction of the aluminum metal with the caustic coating solution (3) causes circulation of the caustic coating solution (3) within the coating vessel (1).

In addition, or more preferably, means for mechanical agitation can be used to increase the circulation and mixing of the caustic coating solution (3) within the tank (1). A preferred mechanical agitation means is depicted as means for rotational stirring which comprises a shaft (41), a motor means (43) and a flat blade turbine (45). One turbine (45) is located beneath each support (9) and each turbine (45) is substantially parallel to each support (9). An optional turbine (45) is also shown located below the surface of the coating solution (3) at about the same height above the substrates (7) on the top support (9) as are the other turbines (45) above the substrates (7) on the other supports (9). The flat blade turbines (45) are driven by the motor means (43) through the shaft (41).

The apparatus of FIG. 1 further comprises a pipeline (47) located at the lower end of the vessel (1) which provides means of transferring or withdrawing solution (3) to or from the vessel (1) as desired. The vessel bottom is equipped with a valve (49) which is preferably of the ram type. Such a preferred valve prevents blocking of the drainhole (50) by sediment or precipitate. The vessel (1) is supported on legs (51), while a framework (53) provides support for the motor means (43) and a bearing for the shaft (41).

In the method of the present invention a preheated coating solution (3) is transferred to the closed coating vessel (1) in which the substrates (7) and porous containers (11) (having aluminum metal therein) have already been placed on the support (9). The gas vent (17) is connected to the foam breaker (23), condenser (27) and receiver (29). After the coating solution (3) has contacted the porous containers (11) and substrates (9)

for a sufficient period of time to form a desired coating, the coating solution (3) is transferred out through the pipeline (47) and valve (49) to a solution holding tank (not shown). The coating vessel (1) is then opened to remove the coated substrates (7) and porous containers (11). During the process the turbines (45) are preferably rotated at a desired speed.

Each support (9) is formed of an open material such as wire mesh, expanded metal sheet or some form of perforated material to provide for the free circulation of the solution (3) within the vessel (1). The supports (9) preferably have an open area of from about 50 to about 80 percent. The supports (9) can be formed of a metal or non-metal which will not be adversely affected by the solution (3). The support (9) is preferably mounted horizontally within the coating tank (1) with the substrates (7) and porous containers (11) preferably attached in some manner, such as by springs (not shown), to the top surface of the support (9).

The turbine (45) is preferably located from about 1 to about 3 centimeters below the support (9) or below the surface of the caustic solution (3). However, the turbine (45) can also be located closer or further to the support (9). The turbine (45) is rotated substantially parallel to the supports (9) through the solution (3) at a tip speed within the range of about 15 to about 150 meters per minute. The turbine (45) preferably has a diameter of from about 35 to about 65 percent of the diameter of the coating tank (1) with about 50 percent being the most preferred diameter. It has been found that in the preferred apparatus and method the use of tip speeds higher than about 150 meters per minute does not result in an improved coating or reduce the time to form a useful coating to an appreciable extent. Tip speeds below about 15 meters per minute do not satisfactorily agitate the solution (3), and can impair the ability of the process to satisfactorily coat the substrates (7).

Rotational stirring devices other than that depicted in FIG. 1, and also other mechanical devices for agitating the solution, can have rotational speeds other than the preferred tip speeds set forth above. The proper speed of rotation or speed of agitation of the other mechanical stirring devices can be readily determined without undue experimentation.

Other rotational stirring devices (not shown) such as pitched blade turbines, marine propellers and other well known stirring devices are also useful in the present invention. These other devices preferably have a diameter of from about 35 to about 65 percent of the diameter of the coating tank.

Mechanical agitation devices, as well as other components of the coating apparatus, such as the porous containers (11) and the supports (9), which come into contact with the caustic solution (3) should not be unacceptably damaged by the coating solution (3). Useful materials include those inert or resistant to caustic solutions such as stainless steel, mild steel and various plastics having a melting point above about 120° C.

The porous or perforated containers and mechanical agitation are set forth in more detail in co-assigned U.S. patent application Ser. No. 392,856, filed on June 28, 1982 which application is incorporated herein as if fully set out herein.

The apparatus and method of the present invention can produce a coating of consistently high quality and of substantial uniformity on the substrates. In the previously used processes the random mixing of the coating solution by the heat and gas bubbles is believed to be at least partially responsible for powdery and non-adherent coatings and for the variations in the uniformity of the coating throughout the substrate, and from substrate to substrate. In the process of the present invention, mixing is more uniform since the rising gas bubbles and the rising heated solution are directed by the partition and the rotational stirring device. The improved mixing and uniformity of the caustic coating solution produced by the present process produces a more uniform coating on the substrates and a coating of generally higher quality.

The coating achieved by the present invention generally appears smooth and translucent which indicates that the coating is hard and is adhering to the substrate. Further, when large amounts alumina are present in the caustic coating solution, the coating quality achieved by the present invention is quite satisfactory while in the previously used process, the presence of large amounts of alumina in the coating solution many times produced a coating which was white, powdery, non-adherent and not of the same high quality as with the present invention,.

Figure 2:
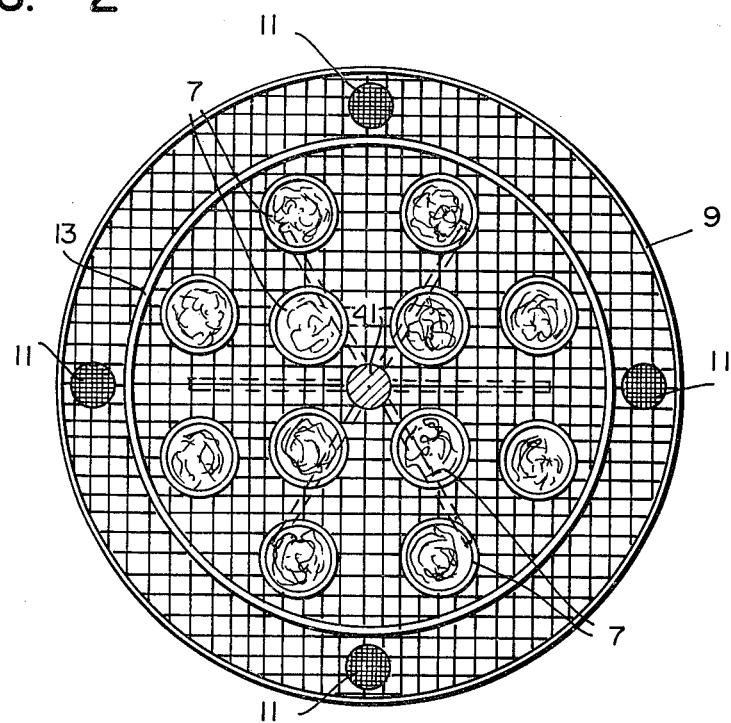
FIG. 2 is a top plan view of a support with the porous containers located on the outer edge of the support.

FIG. 2 illustrates the relative locations of the substrates (7), porous containers (11) and partition (13) in one embodiment of the invention. The substrates (7) are located on the inner portion of the support (9) surrounding the shaft (41). The turbine (45) is shown as being located underneath the support (9). The porous containers (11) having aluminum metal therein are located on the periphery of the support (9) and are separated from the substrates (7) by the partition (13).

Figure 3:
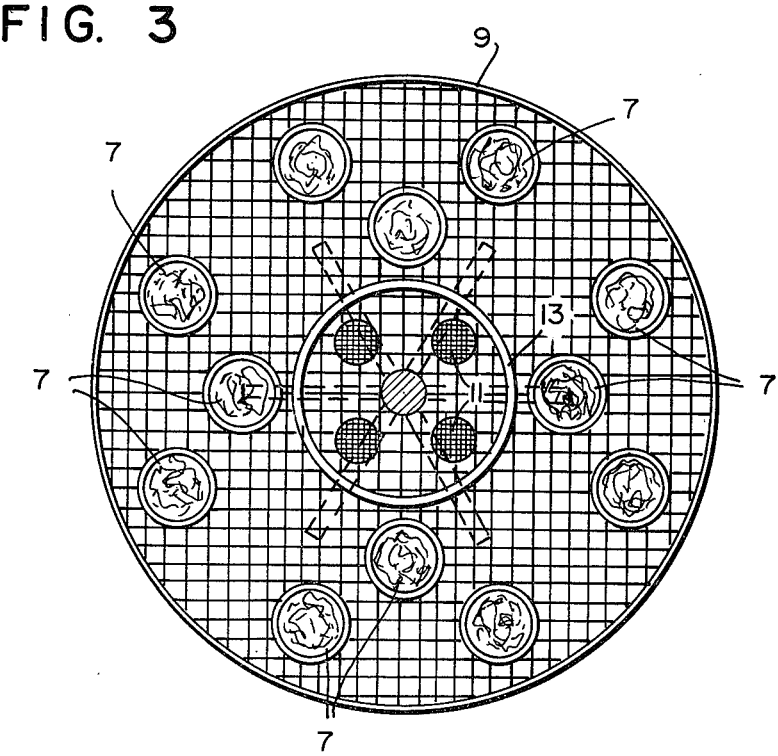
FIG. 3 is a top plan view of a support with the porous containers located on an inner portion of the support.

Another embodiment of the invention is illustrated in FIG. 3, wherein the porous containers (11) having the aluminum metal are grouped around the center of the support (9) while the substrates (7) are located on the outer portion of the support (9). The partition (13) is shown separating the substrates (7) from the porous containers (11). Such a configuration permits a larger number of substrates (7) to be located on the support (9).

The aluminum metal, the coating solution, the substrates, the calcination of the coated substrates subsequent to coating, and all of their preferred embodiments are set forth in more detail in co-assigned U.S. Pat. Nos. 3,227,659; 3,231,520; 3,240,698; and in co-assigned U.S. patent application Ser. No. 392,856, filed on June 28, 1982. The specifications of these three patents and one patent application are incorporated herein by reference, as if fully set forth herein.

Briefly, the preferred caustic coating solution useful in the present invention for reaction with the aluminum metal in the porous containers can be prepared by dissolving metallic aluminum in a strong aqueous solution of an alkali base, preferably an alkali hydroxide. Alternatively, alumina, or an extract from bauxite or bauxite clay can be dissolved in an aqueous solution of an alkali hydroxide, or commercially prepared alkali aluminate can be dissolved in water.

Preferably, the alkali is sodium, however, the alkali can also be potassium, lithium, rubidium or cesium. Further, other cations similar in properties to alkali metal cations can also be used to form the aluminate salt, as quaternary bases such as benzyl-trimethyl ammonium hydroxide and tetramethyl ammonium hydroxide.

The aluminum metal preferably has a purity of at least 99.75 percent for satisfactory results. Use of less pure metal can result in powdery, non-adherent coatings. More pure aluminum is not required for the process.

The mole ratio of aluminum to sodium in the aluminate coating solution during the coating of the substrates should be at least 0.45, and preferably about 0.6–0.8.

The initial concentration of the sodium hydroxide in the coating solution during coating is preferably not less than 0.5 molar, and is preferably in the range of from about 0.75 to 1.5 molar. Such a concentration is desirable so that a serviceable film of alumina can be deposited at a suitable reaction temperature within a reasonable amount of time, preferably from about three to six hours. If the concentration of the sodium hydroxide in the coating solution is substantially more than about 2 molar, it will increase the reaction rate of the aluminum considerably. Since the total quantity of aluminum metal is added initially, the reaction might be too violent. Therefore, the concentration of the sodium hydroxide initially in the coating solution should not be over 1.5 molar.

The following examples are given to further illustrate the invention.

EXAMPLE 1

A coating tank similar to that illustrated in FIG. 1 was used to coat several batches of substrates. The coating tank had a diameter of about 60 centimeters and had a usable volume of about 420 liters. Three supports formed of expanded metal and having a diameter of about 55 centimeters were conventionally mounted in the tank in a horizontal position. On each support were mounted 16 substrates, 5 in an inner circle and 11 in an outer circle. Surrounding the outer circle of substrates was a substantially cylindrical metal partition which was about the same height as the distance between the supports. On the outer portion of the support were located 3 porous containers formed of wire mesh having an open area of about 62.5 percent. The containers held aluminum pellets having a diameter of about 1 centimeter. The substrates which served as models of automotive exhaust filter cartridges comprised about 90 grams of stainless steel wool packed in a glass cylinder, with the cylinder having a packing density of about 150 grams per liter. The packed cylinders had a diameter of about 7.5 centimeters and were about 15 centimeters high.

When the coating tank was fully located it contained about 300 liters of an aqueous caustic coating solution which comprised an aqueous solution of an alkali base, here sodium hydroxide, and an alkali aluminate, here sodium aluminate, initially having an aluminum to sodium ratio of about 0.5. The solution, during coating, was at a temperature of about 97° C. The tank had a water or steam jacket to provide either heating or cooling to maintain the desired temperature during the coating process.

Four 6-flat-blade-turbines each about 30 centimeters in diameter were used, as shown in FIG. 1. One turbine was set below each of the three supports with the fourth turbine being placed at a distance above the top support equal to the distance between the other turbines and the supports directly below them.

The supports with the substrates and porous containers thereon were lowered into the empty coating vessel and the coating solution was transferred to it. There were a total of 48 substrates on the supports. There were also 9 porous containers, having a total of about 3,420 grams of aluminum metal, (Runs 1 to 4) located on the three supports. The coating process was allowed to preceed for between 5 and 6 hours during which time most of the aluminum metal in the porous containers reacted with the caustic solution. The amount of aluminum metal initially placed in the porous containers was calculated to achieve a coating ratio of about 0.9, which is the ratio of the weight of the alumina (converted from weight of alumina hydrate) deposited thereon, to the weight of the stainless steel wool packing. The results of the runs are set forth in Table A.

In run 1 the flat blade turbines were rotated at a tip speed of about 14 meters per minute (15 revolutions per minute). The average coating ratio for all the substrates in this run was about 0.86. Only 2 percent of the substrates had a coating ratio outside of the target range of ±15 percent of the run average, and no substrates had a coating ratio outside of the target range of +20 percent of the run average. The yield, which represented the percentage of aluminum metal actually deposited onto the substrates as alumina compared to the total weight of aluminum metal used in the reaction, was about 57.5 percent.

In run 2, which was a repeat of run 1 using fresh aluminum metal and 48 new substrates, the average coating ratio for the whole run was about 0.92, About 17 percent of the substrates were outside the target range of ±15 percent of the run average, and only about 2 percent were outside of the target range of ±20 percent of the run average. The yield was about 61.5 percent.

EXAMPLE 2

In runs 3 and 4, 48 substrates were coated as in Example 1, however the stirring speed was increased to 71 meters per minute (75 revolutions per minute). In run 3 the average coating ratio was about 0.89, with about 44 percent of the substrates being outside of ±15 percent of the run average and about 23 percent outside of ±20 percent of the run average. The yield was about 59.5 percent. In run 4, under the same conditions as run 3, about 40 percent of the substrates were outside of ±15 percent of the run average and about 21 percent were outside of ±20 percent of the run average. The yield was about 58.8 percent.

EXAMPLE 3

In run 5, the coating procedure of Example 1 was repeated, however, a larger quantity of aluminum metal was used, about 4,200 grams. The flat blade turbines were rotated at a tip speed of about 9.4 meters per minute (about 10 revolutions per minute). The average coating ratio for all 48 substrates was about 1.09, about 42 percent of the substrates were outside of ±15 percent of the run average and about 29 percent were outside of ±20 percent of the run average. The yield was about 59.4 percent.

From the above examples it can be seen that the tip speed of about 14 meters per minute (15 revolutions per minute) for the flat blade turbines produces, in the preferred coating apparatus, the best coating results. Most of the substrates were coated with about the same weight of alumina, and the average coating ratio for the substrates on each support were very similar. When the tip speed was increased, as in Runs 3 and 4, the variation in coating from substrate to substrate increased, the variation of coating weights on the substrates of different supports increased, and the variation of coating weights from the inner to the outer circle of substrates also increased. When the tip speed was reduced to about 9.4 meters per minute, again there was an increase in the variation of the weight of the coatings from substrate to substrate, and the variation in coating weights of substrates on different supports also increased. The results of the runs are set forth in Table A.

EXAMPLE 4

In run 6, the apparatus of Example 1 was used to coat 48 substrates. The total amount of aluminum metal used was about 3,060 grams divided among nine porous containers. No stirring was used. It was found that the average coating ratio of all the substrates was about 0.56, much lower than in any of the other runs where stirring was used. Further, a heavy coating was found on the vessel walls and the yield for this run was about 41.9 percent which was much lower than in any of the other runs. The variations in coating weights from substrate to substrate within the coating vessel was smaller than in Runs 2 to 5 with only about 4 percent of the substrates being outside of ±15 percent of the run average and none being outside of ±20 percent of the run average.

From Example 4 it appears that the lack of stirring in the preferred apparatus produces a low variation in coating weights of the substrates, however, the yield without the stirring is much lower than with stirring.

In the above examples it appears that no stirring or a slow stirring speed produces the smallest variation in coating ratio from substrate to substrate, while stirring acts to increase the yield of the coating process.

The above examples and figures are merely illustrative and not meant to limit the invention which is set forth in the following claims.

TABLE A

| | RUN | | | | | |
|---|---|---|---|---|---|---|
| | 1 | 2 | 3 | 4 | 5 | 6 |
| Stirring Tip Speed (meters per minute) | 14 | 14 | 71 | 71 | 9.4 | 0 |
| Total Weight of The Aluminum in Grams | 3420 | 3420 | 3420 | 3420 | 4200 | 3060 |
| Coating Ratio | | | | | | |
| 1. Support 3 (Top) | | | | | | |
| a. Inner Circle | 0.88 | 0.84 | 0.84 | 0.87 | 1.08 | 0.54 |
| b. Outer Circle | 0.79 | 0.83 | 0.77 | 0.77 | 0.87 | 0.53 |
| c. Support Average | 0.82 | 0.83 | 0.79 | 0.80 | 0.93 | 0.53 |
| 2. Support 2 (Middle) | | | | | | |
| a. Inner Circle | 0.89 | 0.95 | 1.05 | 1.11 | 1.03 | 0.57 |
| b. Outer Circle | 0.88 | 1.00 | 0.81 | 0.80 | 1.05 | 0.54 |
| c. Support Average | 0.89 | 0.99 | 0.89 | 0.90 | 1.04 | 0.55 |

TABLE A-continued

| | RUN | | | | | |
|---|---|---|---|---|---|---|
| | 1 | 2 | 3 | 4 | 5 | 6 |
| 3. Support 1 (Bottom) | | | | | | |
| a. Inner Circle | 0.91 | 0.91 | 1.37 | 1.21 | 1.24 | 0.61 |
| b. Outer Circle | 0.88 | 0.94 | 0.83 | 0.81 | 1.34 | 0.60 |
| c. Support Average | 0.89 | 0.93 | 1.00 | 0.93 | 1.31 | 0.60 |
| Run Average | 0.86 | 0.92 | 0.89 | 0.88 | 1.09 | 0.56 |
| Percent of Substrates Outside of: | | | | | | |
| a. ± 15% of Run Average | 2 | 17 | 44 | 40 | 42 | 4 |
| b. ± 20% of Run Average | 0 | 2 | 23 | 21 | 29 | 0 |
| Yield in Percent | 57.5 | 61.5 | 59.5 | 58.8 | 59.4 | 41.9 |

What is claimed is:

1. A method for coating a plurality of substrates with an alumna hydrate film comprising the steps of contacting a caustic solution with in a coating vessel said substrates to be coated and with a plurality of porous containers having aluminum metal therein; reacting said aluminum metal with said caustic solution to form a coating solution; separating gas bubbles produced from said reaction of said aluminum metal with said caustic solution from said substrates through the use of a partition between said porous containers and said substrates, said partition guiding said gas bubbles away from said substrates to a position where said gas bubbles can be eliminated; and depositing alumina hydrate on said substrates.

2. The method of claim 1 and further comprising the step of calcining said alumina coated substrates.

3. The method of claim 1 and further comprising the step of subjecting said coating solution to mechanical agitation.

4. The method of claim 3 wherein said mechanical agitation comprises the step of rotating a flat blade turbine within said coating solution.

5. The method of claim 1 and further comprising the step of controlling the temperature of said caustic solution and said resulting coating solution.

6. The method of claim 1 and further comprising the steps of venting gas produced within said coating vessel with a cover having means for venting the gas produced by the reaction of said aluminum metal with said caustic solution, cooling said vented gas and returning condensate from said cool gas to said coating vessel.

7. The method of claim 1 wherein said coating solution comprises an aqueous solution of an alkali base and an alkali aluminate.

8. The method of claim 4 wherein said flat blade turbine has a diameter of from about 35 to about 65 percent of said coating vessel.

* * * * *